United States Patent
Lelio et al.

(10) Patent No.: US 11,993,046 B2
(45) Date of Patent: May 28, 2024

(54) TIRE COLD RETREADING METHOD

(71) Applicant: Bridgestone Europe NV/SA, Zaventem (BE)

(72) Inventors: Luca Lelio, Rome (IT); Jeroen Lust, Zaventem (BE); Bram Vincent, Zaventem (BE)

(73) Assignee: Bridgestone Europe NV/SA, Zaventem (BE)

( * ) Notice: Subject to any disclaimer, the term of this patent is extended or adjusted under 35 U.S.C. 154(b) by 382 days.

(21) Appl. No.: 17/435,567

(22) PCT Filed: Mar. 18, 2020

(86) PCT No.: PCT/IB2020/052481
§ 371 (c)(1),
(2) Date: Sep. 1, 2021

(87) PCT Pub. No.: WO2020/188503
PCT Pub. Date: Sep. 24, 2020

(65) Prior Publication Data
US 2022/0055329 A1 Feb. 24, 2022

(30) Foreign Application Priority Data
Mar. 19, 2019 (IT) .......................... 102019000003979

(51) Int. Cl.
*B29D 30/56* (2006.01)
*B29D 30/54* (2006.01)

(52) U.S. Cl.
CPC ........ *B29D 30/56* (2013.01); *B29D 2030/544* (2013.01); *B29D 2030/548* (2013.01)

(58) Field of Classification Search
CPC ............ B29D 30/0601; B29D 30/0605; B29D 30/54; B29D 30/56; B29D 2030/541;
(Continued)

(56) References Cited

U.S. PATENT DOCUMENTS

| 4,756,782 A | 7/1988 | Seiberling |
| 4,857,397 A * | 8/1989 | Mowdood ............ C09D 109/00 264/501 |

(Continued)

FOREIGN PATENT DOCUMENTS

| CN | 102529135 A * | 7/2012 | ............. B29D 30/38 |
| GB | 1477317 A | 6/1977 | |

(Continued)

OTHER PUBLICATIONS

Honda T, JP-57053340-A, machine translation. (Year: 1982).*

(Continued)

*Primary Examiner* — Sedef E Paquette
(74) *Attorney, Agent, or Firm* — Patterson Intellectual Property Law, PC

(57) ABSTRACT

A method for the cold retreading of a tire comprising the following steps: a removal step, during which the tread is removed from the tire in order to expose an equatorial surface of a casing of the tire; a deposition step, during which a cushion and a pre-cured tread strip provided with a tread pattern are deposited around the equatorial surface of the casing; and a curing step, wherein the cushion arranged between the casing and the pre-cured tread strip is cured. The cushion is manufactured with a compound comprising 1 to 30 phr of at least one conductive material having a specific surface area which is greater than or equal to 300 $m^2/g$ and is chosen among graphite and graphene. The curing step comprises a connection step, wherein said cushion is connected to a heat/power source.

20 Claims, 4 Drawing Sheets

(58) Field of Classification Search
CPC ........ B29D 2030/542; B29D 2030/544; B29D 2030/545; B29D 2030/548
USPC .................................................. 156/96, 909
See application file for complete search history.

(56) References Cited

U.S. PATENT DOCUMENTS

| | | | | |
|---|---|---|---|---|
| 5,868,880 | A | * | 2/1999 | Pouille .................. B60C 11/005 156/96 |
| 6,397,910 | B1 | | 6/2002 | Losey et al. |
| 2006/0199894 | A1 | * | 9/2006 | Nakayama ............... C08K 3/04 524/496 |
| 2013/0153102 | A1 | * | 6/2013 | Zhao .................... B60C 1/0016 152/209.5 |
| 2014/0202619 | A1 | | 7/2014 | Sandstrom |
| 2017/0190217 | A1 | * | 7/2017 | Joseph ...................... C08L 7/00 |
| 2019/0047325 | A1 | * | 2/2019 | Tsou ....................... C08L 51/08 |

FOREIGN PATENT DOCUMENTS

| | | | | |
|---|---|---|---|---|
| JP | 57053340 | A | * | 3/1982 |
| JP | 2005280021 | A | | 10/2005 |
| JP | 2006124504 | A | * | 5/2006 |
| WO | 2015116171 | A1 | | 8/2015 |

OTHER PUBLICATIONS

Hattori T, JP-2006124504-A, machine translation. (Year: 2006).*
Nishitani K, CN-102529135-A, machine translation. (Year: 2012).*
International Search Authority: International search report for corresponding application No. PCT/IB2020/052481 dated Jun. 16, 2020, 3 pages.

* cited by examiner

TIRE COLD RETREADING METHOD

The invention relates to a tire cold retreading method.

The invention finds advantageous application in the field of "truck" tire retreading, to which explicit reference will be made in the description below without because of this losing in generality.

At the end of their first use, "truck" tires are usually retreaded, which means that they are provided with a new tread replacing the old, worn tread, which is previously removed. The retreading of a "truck" tire involves mechanically eliminating—from the used tire—the old, worn tread in order to uncover the "casing" and subsequently apply a new tread to the casing. The application of a new tread to the casing involves wrapping a "tread strip" around the casing; subsequently, the casing undergoes a curing process in order to determine an ideal adhesion of the tread strip to the casing.

In the hot retreading process, the tread strip is raw and without pattern, which is manufactured during the curing process, which is carried out in a curing press provided with a mold with the desired pattern. In the hot retreading process, curing takes place at high temperatures (ranging from 150° C. to 160° C.) and at pressures (ranging from approximately 14 to approximately 16 bar), which are needed in order to make the rubber fluid enough to flow in the mold and form the pattern of the tread during the curing process; however, the thermal and mechanical stresses to which the casing is subjected due to these high temperatures and pressures cause additional stress to the casing.

In the cold retreading process, the tread strip (also known as "PCT—Pre Cured Tread—strip") is pre-cured and already provided with the pattern and between the casing and the pre-cured tread strip there is interposed an intermediate strip (hereinafter referred to as "cushion"), which is made of raw rubber and has a bonding function. In the cold retreading process, curing serves the sole purpose of curing the cushion in order to determine an ideal adhesion of the tread to the casing, through the bonding action of the cushion. This curing step does not imply the creation of a pattern of the tread (the tread is already cured) and requires temperature in the order of magnitude of 100° C.-125° C. and pressures in the order of magnitude of 4-6 bar.

If compared with the hot retreading process, the curing step of the cold retreading process evidently requires significantly lower temperatures and pressures and, as a consequence, the casing is subjected to smaller thermal and mechanical stresses.

The cold retreading process, despite having the advantage of preventing the casing from undergoing conditions which could be harmful, suffers however from a low productivity.

Furthermore, in the cold retreading process and in order to ensure a proper adhesion of the tread strip to the casing (with the interposition of the cushion), during curing a radial pressure needs to be applied so as to properly compress the tread strip against the casing. In known retreading plants, this radial pressure to be applied during curing is obtained by inserting the tire in an autoclave, where an overpressure (of approximately 6 bar) is created.

The tire was previously inserted between two flexible "envelopes" (inner and outer) wherein, at first, a vacuum is created and, subsequently, air is blown until a pressure of approximately 4.5 bar is reached; in the autoclave, the pressure difference between the inside (4.5 bar) and the outside (6 bar) of the envelope (usually known as "DPC") is maintained for the entire curing cycle and creates the pneumatic pressure needed to compress the tread against the casing.

The use of autoclaves and of the envelopes, where the "DPC" pressure difference is created, allows manufacturers to obtain a uniform pressure in the whole tread. Indeed, the uniformity of the pneumatic pressure (which could never be achieved in a mechanical manner, as the recesses of the pattern cannot be reached due to their dimensions, their shapes and their number) ensures an ideal adhesion of the tread to the casing.

However, the use of the autoclave and of the envelopes is affected by different drawbacks: first of all, in use, the autoclave has an inner pressure that is significantly greater than atmospheric pressure and, hence, requests specific safety design of the equipment and strict operational procedure to be followed by operator of the plant. Furthermore, the application of the envelopes to the tire is fairly long and complicated. Indeed, the possible breaking of the envelopes during curing (which frequently happens) forces operators to restart the retreading process from the beginning or, in some cases, even to scrap away the tire being retreaded.

Therefore, there is the need to find a solution that allows manufacturers to carry out a tire cold retreading process, without because of this having to face the drawbacks in terms of productivity and safety that are typical of the prior art discussed above.

The inventors of this invention found a solution which is capable of fulfilling said need through the use of a cushion having a particular composition.

The subject-matter of this invention is a tire cold retreading method comprising the following steps:
- a removal step, during which the old, worn tread is removed from the tire in order to expose an equatorial surface of a casing of the tire;
- a deposition step, during which a cushion and a pre-cured tread strip provided with a tread pattern are deposited around the equatorial surface of the casing; and
- a curing step, during which the cushion arranged between the casing and the pre-cured tread strip is cured;
- the retreading method is characterized in that said cushion is manufactured with a compound comprising 1 to 30 phr of at least one conductive material chosen among graphite, graphene and a carbon black having a specific surface area which is greater than or equal to 300 m$^2$/g; and in that it comprises a connection step, during which said cushion is connected to a heat or power source in order to carry out said curing step.

Said compound preferably comprises 5 to 15 phr of said conductive material.

Said cushion preferably comprises at least one annular edge portion, which laterally projects from said casing.

Said heat source preferably comprises at least one heated annular portion, which is arranged in contact with said projecting annular edge.

The method preferably comprises the further following steps:
- a coating step, during which a filler in the fluid state is deposited on the pre-cured tread strip before said curing step, thus forming a coating which covers the pre-cured tread strip;
- a compression step, during which, during said curing step, the tire is subjected to a radial pressure applied on the tread strip by pressing, from the outside, against the filler coating the pre-cured tread strip;
- a removal step, during which, following the curing step, the filler is removed from the pre-cured tread strip.

The filler preferably contains a material that shrinks when dry; more preferably, said shrinking material is clay.

A further subject-matter of the invention is a tire retreaded by means of a cold retreading method according to the invention.

Hereinafter there is a description of an embodiment of the invention, by mere way of explanatory and non-limiting example, with reference to the accompanying drawings, wherein.

Figure 1:
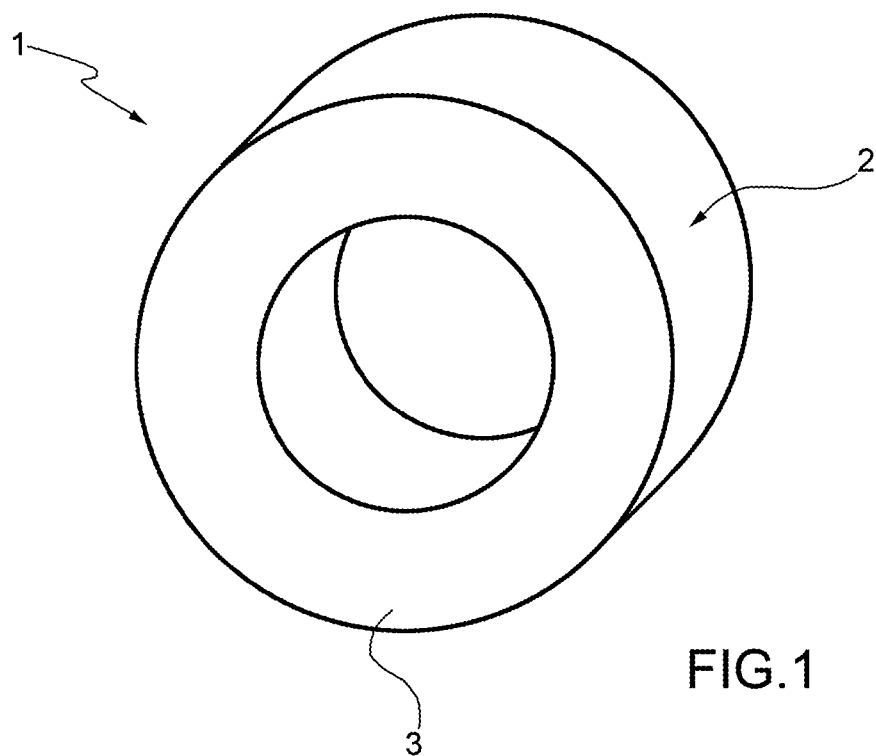
FIG. 1 is a schematic view of a tire, in which the old, worn tread was mechanically removed, thus exposing an equatorial surface of a respective casing.

In FIG. 1, number 1 indicates, as a whole, a tire, in which the old, worn tread was mechanically removed, thus exposing an equatorial surface 2 of a respective casing 3.

The procedure with which the old, used tread is removed is known and, since it is not relevant for the invention, it will not be discussed any further.

Figure 2:
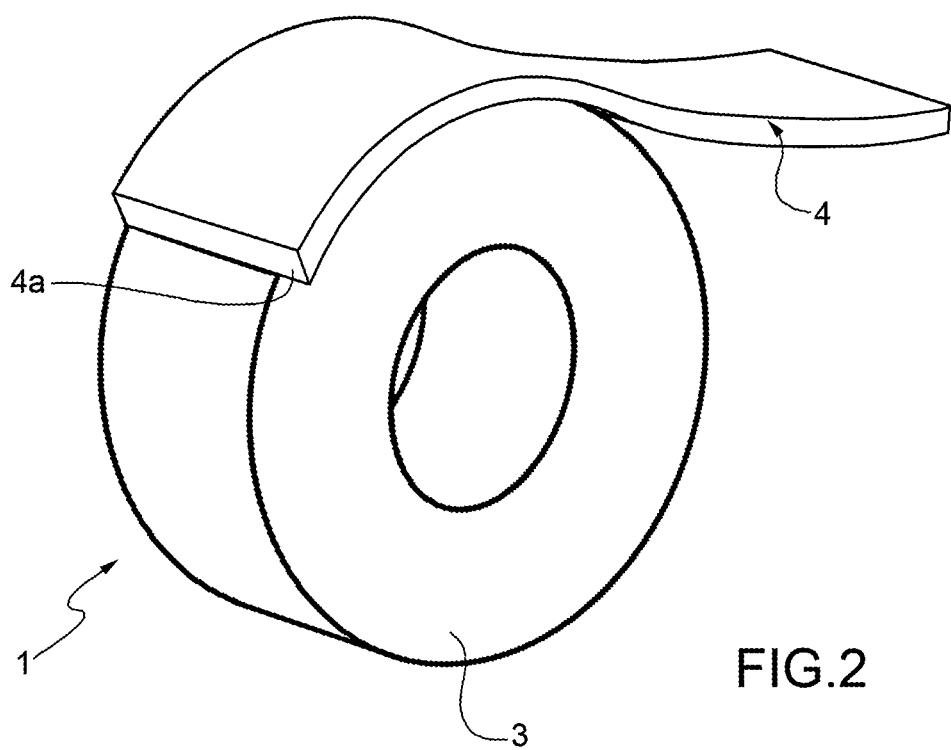
FIG. 2 is a schematic view of the wrapping of a cushion around a casing of a tire to be retreaded.

FIG. 2 shows a deposition step, during which a cushion 4 is wrapped on the equatorial surface 2 of the casing 3. As a person skilled in the art knows, the cushion is an intermediate strip of raw rubber, which fulfils a binding function between the casing of the used tire and the new, previously cured tread strip.

In particular, the cushion comprises an annular edge portion 4a, which extends on the side of the casing 3. This annular edge portion 4a has the function of providing an exposed side portion of the cushion, which is such that it can be connected to a heat or power source during the curing step, as explained more in detail below.

Table I shows the phr composition of the compound making up the cushion.

TABLE I

| | |
|---|---|
| Natural rubber | 100 |
| Carbon black | 40 |
| Zinc oxide | 5 |
| Stearic acid | 1 |
| Antioxidants | 5 |
| Sulphur | 2.5 |
| Accelerators | 1 |
| Alkylphenol-formaldehyde resin | 9 |
| Conductive material* | 10 |

*The conductive material is chosen among graphite, graphene and carbon black having a specific area which is greater than or equal to 300 $m^2/g$.

Experiments have shown that the total quantity of conductive material must range from 1 to 30 phr in order for the heating to be effective for the purpose of curing. The total quantity of conductive material must preferably range from 5 to 15 phr.

Figure 3:
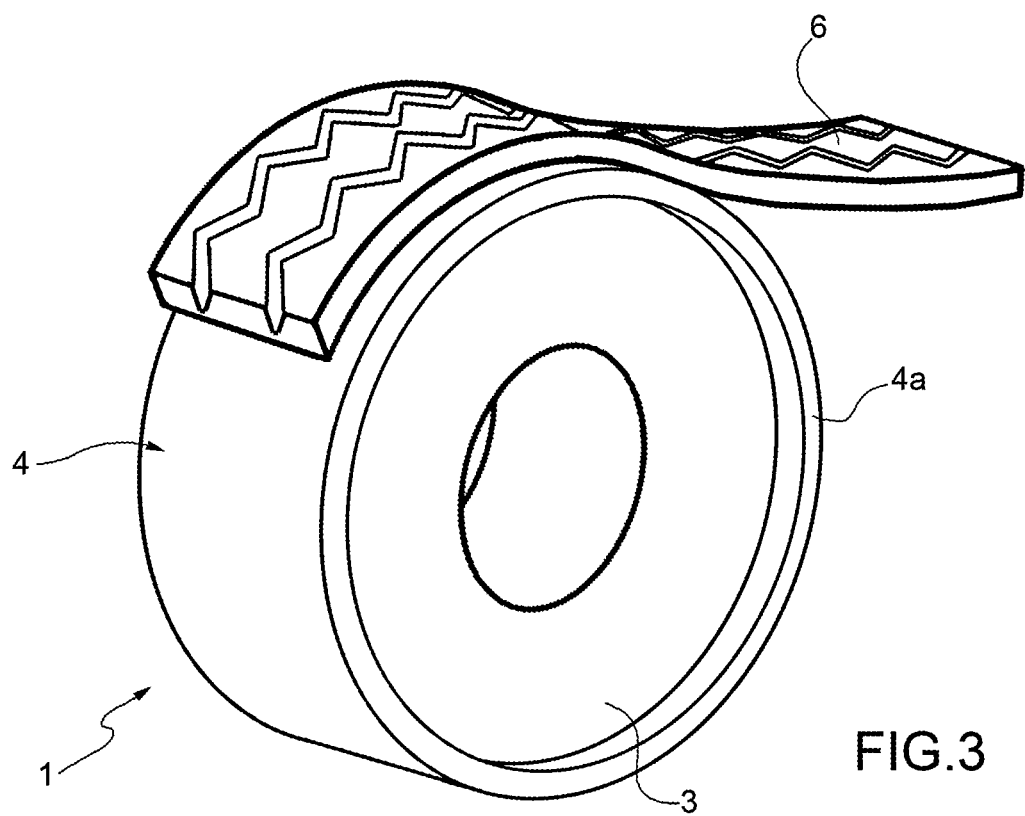
FIG. 3 is a schematic view of the wrapping of a pre-cured tread strip around the cushion with the interposition of the conductive element.

FIG. 3 shows another operation of the deposition step, during which a pre-cured tread strip 6 is wrapped on the cushion 4. It should be pointed out that the pre-cured tread strip 6, since it has already been cured in a suitable mold, has a defined tread pattern.

Figure 4:
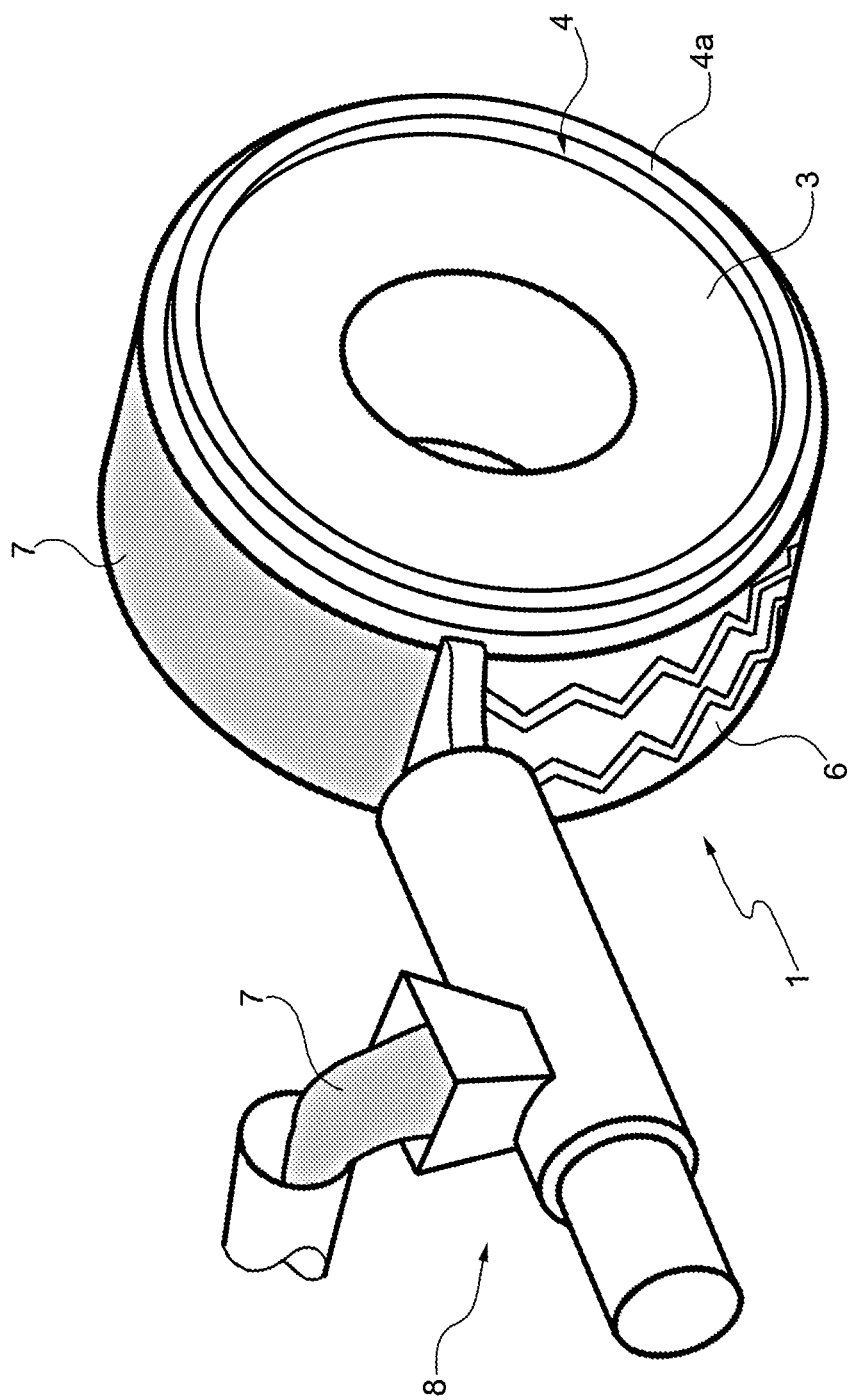
FIG. 4 is a schematic view of the application of a filler on the previously wrapped pre-cured tread strip.

FIG. 4 shows a coating step, during which, after the wrapping of the pre-cured tread strip 6 and before subjecting the tire 1 to a curing step, a filler 7 in the fluid state is deposited on the pre-cured tread strip 6. The filler 7 completely fills the pattern of the tread (namely, it penetrates the grooves of the tread pattern) and forms a coating which covers the pre-cured tread strip 6. In other words, the filler 7 creates a "negative" of the pre-cured tread strip 6.

In particular, the filler 7 is applied on the pre-cured tread strip 6 so as to completely cover it and, hence, have, on the outside, a flat equatorial surface (namely, a flat surface, i.e. without recesses and grooves). In other words, the filler 7 is used to form a coating that "levels off" the pre-cured tread strip 6, thus offering, towards the outside, a flat equatorial surface (namely, a smooth surface without recesses and grooves).

In the embodiment shown in FIG. 4, the filler 7 is applied on the pre-cured tread strip 6 by means of an applying device 8 after the pre-cured tread strip 6 has been wrapped around the casing 3 (namely, when the pre-cured tread strip 6 has an annular shape).

According to a preferred embodiment, the filler 7 can be made of clay, which has the advantage of being easy to be found, not very expensive and recyclable for further retreading operations or in general. Furthermore, the natural shrinking of the clay when dry also allows the filler 7 to be easily removed from the pattern of the tread.

Figure 5:
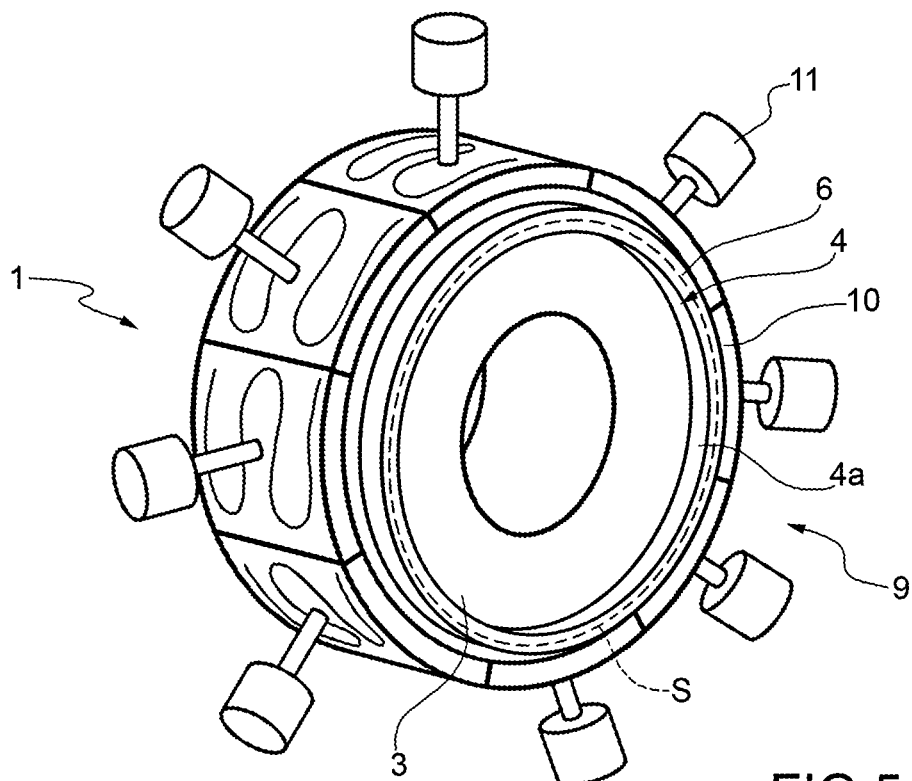
FIG. 5 is a schematic view of a compression during the curing of a retreaded tire.

FIG. 5 shows a curing and compression step, during which the tire 1 is housed inside a curing mold 9, which consists of a plurality of pressing bodies 10, which are each shaped like a circular sector and form, all together, a ring designed to contain, on the inside, the tire 1.

According to the figure, the mold 9 comprises a heat source indicated with S and represented with a broken line.

The heat source S comprises at least one heated annular surface, which, during the curing step, is arranged in contact with the annular edge portion 4a of the cushion 4. In this way, thanks to the thermal conductivity of graphite or graphene or a carbon black having a specific surface area which is greater than or equal to 300 $m^2/g$, the cushion 4 is entirely heated at a temperature that is such as to cause the curing thereof.

This solution offers the great advantage of not having to subject the entire tire to a heating process, with the consequence both that already cured parts of the tire do not risk being deteriorated and that the curing step is quicker.

Each pressing body 10 is radially moved (hence, is radially pushed against the tire 1) by an actuator 11 (for example a pneumatic or hydraulic cylinder). According to a preferred embodiment, the actuators 11 are designed to apply on the pressing body 10 a radial pressure towards the centre (namely, a radial pressure compressing the tire 1) with an adjusted force, which is determined in such a way that, during the curing process, the tire 1 (namely, the pre-cured tread strip 6 which is part of the tire 1) is radially compresses with a desired pressure; by way of example, the actuators 11 could use, in order to radially push the pressing bodies 10, a pneumatic or hydraulic system with an adjusted pressure or they could use a completely mechanical system provided with adjusted springs.

During the curing process, the tire 1 is kept at ambient pressure and a radial pressure is mechanically applied to the pre-cured tread strip 6 by means of the pressing bodies 10 of the curing mold 9 and with the interposition of the filler 7. In other words, the pressing bodies 10 of the curing mold 9 press against the filler 7, which has, on the outside, a smooth surface (hence, the pressure exerted by the pressing bodies 10 is distributed in a uniform manner on the entire filler 7); the filler 7 transmits the pressure exerted by the pressing bodies 10 in a uniform manner to the entire pre-cured tread strip 6, since the filler 7 is homogeneously distributed on the entire pre-cured tread strip 6 (namely, even in all the grooves of the tread pattern). As a consequence, the filler 7 acts like a "distributor" of the pressure exerted by the pressing bodies 10 on the entire pre-cured tread strip 6, since it is a coating that reproduces in negative the shape of the pre-cured tread strip 6.

Figure 6:
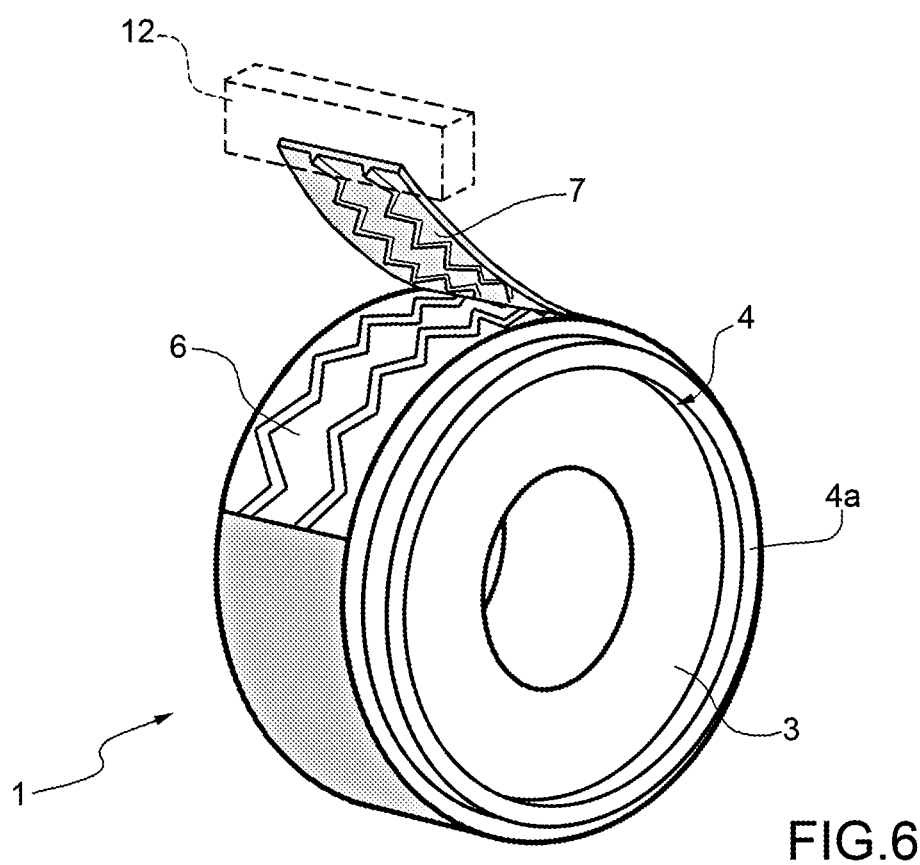
FIG. 6 is a schematic view of a removal of a filler from the pre-cured tread strip after curing.

FIG. 6 shows a removal step, during which, after the curing step, the filler 7 is removed from the pre-cured tread strip 6 by means of a suitable removal device 12 and with this operation the tire 1 retreading process ends.

To sum up, the cold retreading method according to the invention makes sure that the curing step is carried out without using autoclaves and by subjecting the sole cushion to heating. This leads to the important advantage of having a quicker and safer curing (avoiding the safety problems caused by the use of autoclaves) and of preventing, to a significant extent, the already cured parts of the tire from having to undergo a heating process, which could jeopardize them. These results are obtained thanks to the particular composition of the cushion, which allows it to be heated after having been connected to a heat source or to a power source.

Furthermore, the fact that the pre-cured tread strip is covered with the filler prevents manufacturers from having to use vacuum envelops, thus avoiding the complicated tire dressing/undressing procedures and the risks of breaking of the envelops.

The invention claimed is:

1. A method for a cold retreading of a tire, the method comprising:
   removing a tread from the tire in order to expose an equatorial surface of a casing of the tire;
   depositing a cushion and a pre-cured tread strip with a tread pattern around the equatorial surface of the casing, the cushion manufactured with a compound comprising 1 phr to 30 phr of at least one conductive material, having a specific surface area that is greater than or equal to 300 $m^2/g$, and chosen from among graphene, graphite, and carbon black;
   curing the cushion arranged between the casing and the pre-cured tread strip, during which the cushion is connected to a heat source or a power source;
   prior to the curing step, depositing a filler in a fluid state on the pre-cured tread strip, to form a filler coating that covers the pre-cured tread strip; and
   following the curing step, removing the filler from the pre-cured tread strip.

2. The method of claim 1, wherein the compound comprises 5 phr to 10 phr of the at least one conductive material.

3. The method of claim 1, wherein the cushion comprises at least one annular edge portion laterally projecting from the casing.

4. The method of claim 3, further comprising:
   arranging at least one annular heated portion of the heat source in contact with the at least one annular edge portion.

5. The method of claim 1, further comprising:
   during the curing step, applying a radial pressure on the pre-cured tread strip by pressing, from an outside of the tire, against the filler coating.

6. The method of claim 5, wherein applying the radial pressure on the pre-cured tread strip comprises pressing a plurality of pressing bodies of a curing mold against the filler coating.

7. The method of claim 6, wherein each of the plurality of pressing bodies comprises a circular sector and the plurality of pressing bodies form a ring around the tire.

8. The method of claim 1, wherein the filler comprises a material that shrinks during curing.

9. The method of claim 8, wherein the shrinking material comprises clay.

10. The method of claim 1, wherein the cushion comprises raw rubber.

11. The method of claim 1, wherein the compound further comprises at least one of natural rubber, zinc oxide (ZnO), stearic acid, antioxidants, sulphur, accelerators, alkylphenol-formaldehyde resin, and combinations thereof.

12. The method of claim 1, wherein the step of curing further comprises curing the cushion arranged between the casing and the pre-cured tread strip at a temperature from 100° C. to 125° C.

13. The method of claim 1, wherein the step of curing further comprises curing the cushion arranged between the casing and the pre-cured tread strip at a pressure from 4 bar to 6 bar.

14. A tire which is retreaded via the cold retreading method of claim 1.

15. A method for a cold retreading of a tire, the method comprising:
   removing a tread from the tire in order to expose an equatorial surface of a casing of the tire;
   depositing a cushion and a pre-cured tread strip with a tread pattern around the equatorial surface of the casing, the cushion manufactured with a compound comprising at least one conductive material;
   connecting the cushion to a heat source or a power source;
   depositing a filler in a fluid state on the pre-cured tread strip to form a filler coating that covers the pre-cured tread strip;
   applying a radial pressure on the pre-cured tread strip by pressing, from an outside of the tire, against the filler coating;
   curing the cushion arranged between the casing and the pre-cured tread strip; and
   removing the filler from the pre-cured tread strip.

16. The method of claim 15, wherein the compound comprises 1 phr to 30 phr of the at least one conductive material, having a specific surface area that is greater than or equal to 300 $m^2/g$, and chosen from among graphene, graphite, and carbon black.

17. The method of claim 15, wherein the cushion comprises at least one annular edge extending on a side of the casing.

18. The method of claim 17, further comprising the step of:
   arranging at least one annular heated portion of the heat source in contact with the at least one annular edge.

19. The method of claim 15, wherein the filler comprises a material that shrinks during curing.

20. The method of claim 15, wherein the step of curing further comprises curing the cushion arranged between the casing and the pre-cured tread strip at a temperature from 100° C. to 125° C.

* * * * *